Oct. 20, 1959  J. B. FAIRBROTHER  2,909,640
ELECTRICAL DISCHARGE MACHINING APPARATUS
Filed March 10, 1958  2 Sheets-Sheet 1

INVENTOR.
JAMES B. FAIRBROTHER
BY
Pearson + Pearson
ATTORNEYS

Oct. 20, 1959   J. B. FAIRBROTHER   2,909,640
ELECTRICAL DISCHARGE MACHINING APPARATUS
Filed March 10, 1958   2 Sheets-Sheet 2

INVENTOR.
JAMES B. FAIRBROTHER
BY
Pearson + Pearson
ATTORNEYS

United States Patent Office 2,909,640
Patented Oct. 20, 1959

2,909,640

ELECTRICAL DISCHARGE MACHINING APPARATUS

James B. Fairbrother, Amesbury, Mass.

Application March 10, 1958, Serial No. 720,160

8 Claims. (Cl. 219—69)

This invention relates to apparatus for simultaneously removing metallic material from a plurality of separated areas of an electrically conductive workpiece by electric discharge machining apparatus.

Electric discharge machining tools are well known and commercially available. One well known type is that made by Elox Corporation of Royal Oak, Michigan. Elox Corporation Bulletin No. 1 of December 9, 1953 explains the operation of such tools and U.S. Patent 2,588,744 to McKechnie of March 11, 1952 and U.S. Patent 2,501,954 to McKechnie et al. of March 28, 1950 contain further description of such tools and their method of operation.

In general, electric machining tools of the prior art have included a single electrode tool, arranged to move toward and away from an electric conductive workpiece by a single actuating means. It has also been proposed to use a multiple head on such a single electrode tool, for example, a head having ten closely spaced, parallel electrodes fixed thereto for drilling ten closely spaced holes at a time. Such a multiple head is useful in forming parallel holes, slots and the like in one area of a workpiece. In forming a plurality of radial holes in a hollow cylinder, or otherwise forming holes angularly related to each other, it has been customary to form the holes one at a time, each separate drilling operation being time consuming and requiring readjustment of the tool or workpiece.

The principal object of this invention is to provide electric discharge machining apparatus having a plurality of individual electrode tools movable independently and angularly relative to each other but controlled as a unit for simultaneously removing material from separated areas of a workpiece.

Another object of the invention is to provide electric discharge machining apparatus especially useful in forming a plurality of holes simultaneously entirely around a workpiece whether the workpiece is symmetrical or non symmetrical in configuration.

A further object of the invention is to provide novel means for moving a workpiece, relative to a plurality of independent, annularly arranged, electrode tools all submerged in dielectric coolant in a coolant container.

Still another object of the invention is to provide means for jointly and uniformly moving a plurality of spaced apart, individual electrodes toward and away from an electric conductive workpiece in accordance with the voltage discharge at the gaps between the electrodes and the workpiece.

Other objects and advantages of the invention will be apparent from the claims, the description of the drawings and from the drawings in which:

Figure 1:
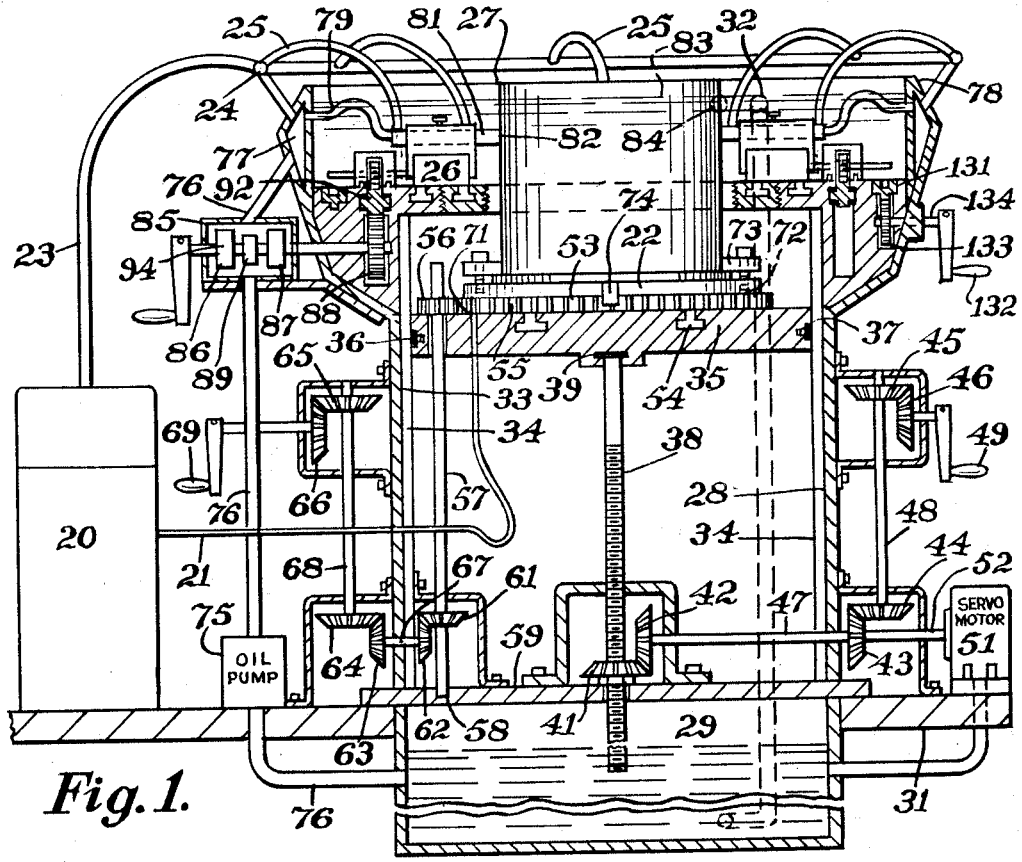
Fig. 1 is a front elevation in section of electric discharge machining apparatus in accordance with the invention.

In the drawings, 20 represents a power supply unit, such as an "Elox" unit, having a conductor 21 supplying a positive current to the workpiece support 22 and having a conductor 23 supplying a negative current to the insulated copper ring 24 which feeds the jumper wires 25 of the electrode tools 26. The machine 27 is in the form of a container or tank, having a base portion 28, a coolant reservoir portion 29, which may be below the level of the floor 31 as shown, and an outwardly flared upper portion constituting a coolant tank 32.

The inner wall 33 of machine 27 is preferably circular in cross section and provided with vertical ways, or tracks such as 34 upon which an electrically insulated work table, or platform, 35 is vertically slideable. Suitable oil seals such as 36 are provided in the way grooves 37 of table 35 to permit vertical slidability while retaining the coolant in the tank 32. Table 35 is supported by the vertical, central, threaded shaft 38 journalled thereto at 39 and threadedly engaged in bevel gear 41 whereby turning gear 41 causes the table to move up or down vertically. Gear 41 is turned through the train of bevel gears 42, 43, 44, 45 and 46 and shafts 47 and 48 manually by the crank handle 49 or by the servo motor 51 and shaft 52 powered from a suitable source not shown.

A turntable 53 is rotatable on table 35 in the groove 54 and provided with peripheral teeth 55 meshed with a gear 56. Gear 56 is splined on a vertical shaft 57 to slide therealong and rotate therewith. Shaft 57 is journaled at 58 to a cross member 59 and is turned by a bevel gear 61. Gear 61 is turned by a train of gears 62, 63, 64, 65 and 66 and shafts 67 and 68 by means of a crank handle 69 whereby turning handle 69 from outside the machine 27 causes the turntable 53 to rotate as desired in a horizontal plane regardless of the vertical position of table 35. The electrically conductive workpiece support 22 is mounted on the turntable 53 and connected at 71 to the conductor 21. Suitable threaded holes 72 are provided in support 22 for receiving the bolts of workpiece clamps such as 73. A central recess 74 is also provided in support 22.

The coolant used in the machine 27 is dielectric and may be "Eloxol" commercially available from the above mentioned Elox Corporation or a reprocessed transformer oil. It accumulates in the reservoir 29 and is pumped by a pump 75, of any well known type, through tubes such as 76 under pressure into an annular conduit 77 encircling the rim 78 of the tank 32. A plurality of flexible tubes such as 79 connect the conduit 77 with each hollow electrode 81 of each electrode tool 26 to provide a constant flow of dielectric coolant from the inner terminal ends 82 of each electrode. The coolant emerging from the electrodes is maintained at a constant level in tank 32, as shown by the dotted line 83, by means of the outlet pipe 84 which conducts surplus coolant back to reservoir 29. The electrodes are thus submerged under at least one half inch of coolant during the electric discharge machining operation.

At 85 a servo motor mechanism is shown such as is presently used on the above mentioned "Elox" machine for automatically controlling the displacement of a single electrode.

Inasmuch as the servo-motor mechanism used herein is commercially available and not my invention, it is not described in detail. However, such mechanisms usually include an electric motor 86, reduction gears 87, a power feed drive gear 88, a magnetic clutch 89 and a torque spring 94 all illustrated somewhat diagrammatically in Fig. 1. The power feed drive gear 88 is meshed with the lower teeth 91 of a ring gear 92 which is rotatably mounted in suitable bearings in the annular bed plate 93 encircling tank 32.

Figure 4:
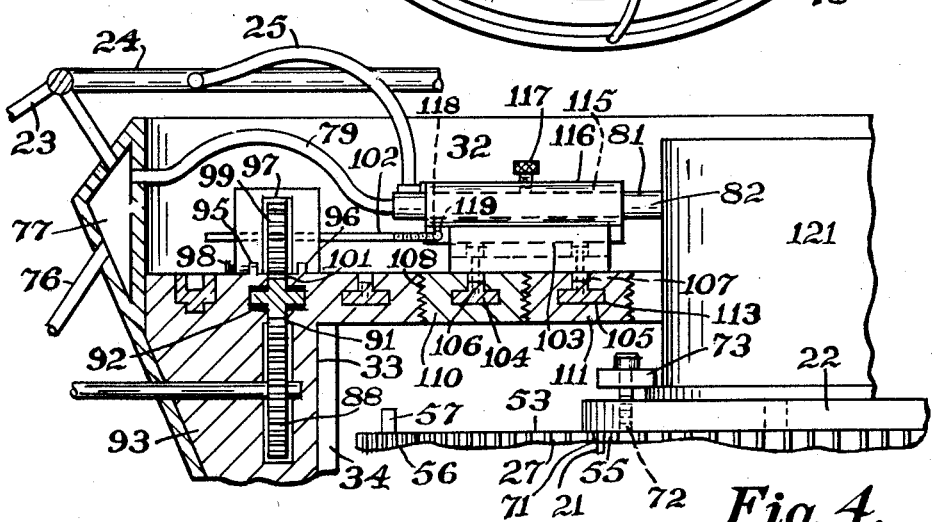
Fig. 4 is an enlarged detail view on line 4—4 of Fig. 3 of one of the plurality of independently movable electrode tools of the invention.

Servo-motor mechanism 85, through power feed drive gear 88, drives the ring gear 92 for advancing and retracting the electrodes 81 to maintain the required gap and continually remove metal from the work piece. A pair of radially spaced circular tracks, or ways, 95 and 96 extend around bed plate 93 upon which a plurality of identical pinion gear blocks such as 97 are slideable circumferentially and removably affixed by means of set screws such as 98 (Fig. 4).

Each pinion block 97 carries a pinion 99 enmeshed with the upper teeth 101 of ring gear 92 and axially threaded on a threaded rod 102 slideable in the block 97. A plurality of electrode guides such as 103 are also provided, each having a pair of radially spaced depending inverted T shaped lugs 104 and 105 threadedly affixed therebelow by the lug bolts 106 and 107. The inner periphery of the bed plate 93 is threaded at 108 and a set of internally and externally threaded annular bed plates such as 110 and 111 are provided, ranging from small to large diameter and adapted to be threaded into each other until interlocked to vary the the area of the bed of the machine. Each annular bed plate such as 110 includes a circular lug groove of inverted T shaped configuration such as 113 in which a lug 104 or 105 is insertable sideways and then twistable in order that the guides 103 may be fixed in substantially radial position relative to the axis of the machine at the desired distance from that axis.

Each guide 103 includes a radially extending upper groove 115 in which an electrode clamp 116 is slidable radially, the clamp 116 having a set screw 117 for holding a hollow tubular electrode 81. It will be understood in the art that the electrodes 81 may be of any desired cross section and are shaped on the outside to conform with the particular shape of the cut to be made. Also that the clamp 116 is correspondingly shaped to hold the desired electrode, but includes a portion slideable in the guide 103. The threaded rod 102 is cut to extend from the pinion block 97 and the pinion 99 to the guide 103, depending on the outside dimensions of the workpiece and the number of bed plate rings such as 110 used for the particular machining operation. The terminal tip 118 of each rod 102 is preferably enlarged into disc form to fit a corresponding recess 119 in the clamp 116 whereby it may be engaged and disengaged by a sidewise movement.

It will be apparent that rotation of the drive gear 88 by servo motor mechanism 85 will rotate ring gear 92 unidirectionally thereby rotating each pinion gear 99 uniformly and advancing each electrode 81 a uniform radial distance toward the workpiece 121. Dielectric coolant is fed to each hollow electrode continuously and discharged from the cutting tips 82 of the electrodes as they penetrate the workpiece.

Figure 5:
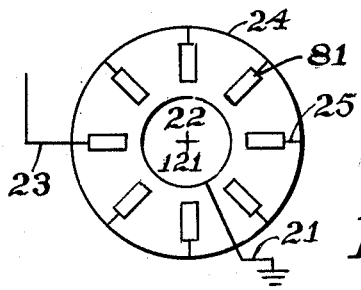
Fig. 5 is a wiring diagram illustrating the electrical connections.

As shown in Fig. 5, the electrodes 81 are all negative and supplied by jumper wires 25, copper ring 24 and the negative lead wire 23 of the main circuit for producing the electric discharge at the point of cutting. The positive lead wire 21 of the main circuit is grounded and connected to the workpiece support 22 which is electrically connected to the workpiece 121.

Figure 2:
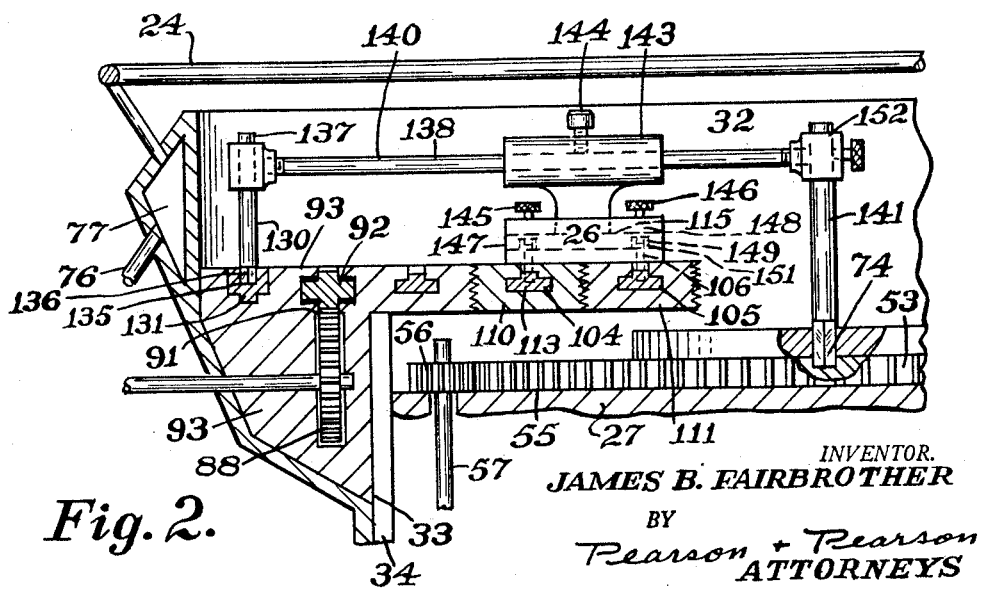
Fig. 2 is an enlarged, detail view of the means for radially aligning each independently movable electrode tool of the invention.
Figure 3:
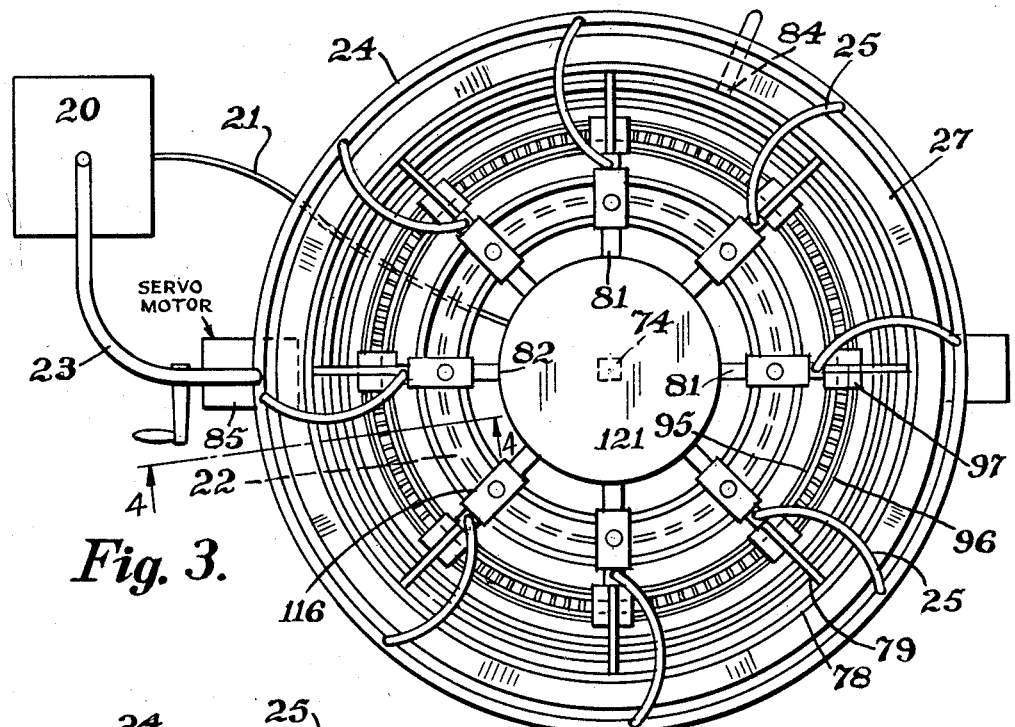
Fig. 3 is a plan view of the device shown in Fig. 1.

In operation the plurality of individual, independently movable electrode tools of this invention, comprising the pinion blocks 97, threaded rods 102, guides 103, clamps 116 and electrodes 81 are first positioned in the desired spacial arrangement around the workpiece opposite the separated areas thereon from which material is to be removed. The electrode tools may be closely or widely spaced apart circumferentially around the workpiece and as shown in Fig. 2, each guide is aligned exactly with the radii of the bed plate rings at precisely the radial position desired. For this purpose an alignment device 130 is provided which includes a vernier scale ring 131 recessed in the bed plate 93 and rotatable by the crank handle 132 through gear 133 and shaft 134. Ring 131 includes a squared recess 135 for the squared end 136 of the outer post 137 of the inverted U shaped member 138. Member 138 includes the scale bar 140, and an inner post 141, the latter having a squared end 142 which fits the squared recess 74 in workpiece support 22 which is at the vertical axis of machine 27. Scale bar 140 includes a length scale and a scale slide 143, there being a set screw 144 for affixing the slide 143 at the desired distance from the axis of machine 27. Slide 143 includes a pair of knurled knobs 145 and 146 and a lower portion 147 which closely fits within the grooves 115 of the guides, or shoes, 103 of each electrode tool. Each knob such as 145 includes a shaft 148 having a lower tip 149 fitting a corresponding recess 151 in the bolts such as 106 of the lugs 104 for tightening the same. A swivel head 152 connects the inner post 141 to the scale bar 140 to enable the scale bar 140 to be rotated by ring 131 to the desired angular position for radially locating each guide 103 and then permit the guide 103 to be moved radially to the desired distance from the workpiece or machine axis.

When all of the guides 103 are positioned radially, the clamps 116 with their respective electrodes 81 are slideably fitted in the grooves 115 and the pinion blocks 97 are radially aligned with their respective guides. The rods 102 are then attached to the clamps 116 and thereafter rotation of ring gear 92 will result in uniform, radial displacement of all of the electrodes 81 as a unit. If one of the plurality of electrodes 81 erodes more rapidly than another or otherwise fails to cut properly, the servo mechanism will advance and retract all of the electrodes until a proper electric discharge is re-established for all electrodes.

I claim:

1. Electric discharge machining apparatus for simultaneously cutting a plurality of angularly spaced holes around the circumference of a work piece, said apparatus comprising a base, a coolant tank on said base; a vertically movable work table within said tank; means for raising and lowering said work table relative to said tank; annular tool support means mounted within said tank, intermediate of the height thereof, for encircling a work piece carried by said work table; a plurality of individual electrode tools mounted around said annular tool support means, within said tank, each including a hollow electrode slidably mounted for movement to and from said work piece; a threaded shaft extending outwardly from said electrode and a pinion gear rotatably mounted on said tool support means and axially threaded on said shaft; a single ring gear mounted to rotate in a horizontal plane in the outer peripheral portion of said annular tool support means, each said pinion gear being meshed with the teeth of said ring gear; electrical means connecting all of said electrodes in the electrical circuit of said machining apparatus with the electrodes negative and said work piece positive and a single servo-motor mechanism driven by said apparatus and driving said ring gear for moving all of said electrodes simultaneously to and from said work piece.

2. Apparatus as specified in claim 1 plus a turn table carried by said work table and means manually operable from outside said apparatus for turning said turn table regardless of the vertical position thereof in said coolant tank.

3. A combination as specified in claim 1 plus flexible tube means supplying dielectric coolant to the terminal tip of each said hollow electrode through the interior thereof.

4. A combination as specified in claim 1 wherein said annular tool support means includes a set of peripherally threaded, annular, concentric plates interengageable with each other and each having means thereon for fixing said electrode tools at selected radial distances from the central, vertical axis of said coolant tank.

5. A combination as specified in claim 1 wherein each said electrode tool includes a guide in which said electrode is axially slidable and spaced lugs depending from each said guide; said annular tool support means comprises a plurality of interlocking annular plates, each having a concentric lug groove in the upper face thereof and said guides include lug bolts for affixing the same circumferentially relative to said grooves.

6. In combination with electrical discharge machining apparatus having servo motor mechanism for controlling the displacement of a single electrode relative to an electrically conductive workpiece, apparatus for simultaneously, electrically machining a plurality of radial cuts toward the central axis of a workpiece, said apparatus comprising a coolant container having an annular tool supporting plate mounted horizontally therein; a plurality of angularly spaced radial guides extending around the upper face of said plate and removably fixed thereto; a plurality of hollow electrode carrying clamps each radially slideable in one of said radial guides and each having a threaded rod extending radially outwardly therefrom; a plurality of pinion carrying blocks mounted for circumferential sliding movement on said plate, each pinion axially threaded on the rod of one of said electrode clamps; a rotatable ring gear on said plate said ring gear encircling said container and having upwardly facing teeth meshed with all of said pinion gears and ring gear drive means, connecting said ring gear to said servo-motor mechanism for simultaneously controlling the axial displacement of all of said electrodes jointly as a single electrode.

7. In electrical discharge machining apparatus of the type having servo-motor mechanism with a power feed gear for maintaining a predetermined gap between an electrode and a workpiece the combination of a coolant container; electrically conductive workpiece supporting means within said container, a plurality of horizontal, hollow, individual electrodes mounted for radial sliding movement within the confines of said container; a rotatable pinion gear associated with each said electrode within said container for effecting radial sliding movement thereof; a single rotatable ring gear encircling the interior of said container and threadedly enmeshed with each said pinion gear, said ring gear being driven by said power feed gear for simultaneously advancing and retracting said electrodes radially and dielectric coolant means connected to each electrode for discharging coolant from the inner end thereof and immersing said electrodes in said coolant.

8. A combination as specified in claim 7 plus manual means, operable from outside said container, for threadedly moving said workpiece vertically and for rotating said workpiece in a horizontal plane.

References Cited in the file of this patent
UNITED STATES PATENTS
2,778,925    Gross et al. ------------- Jan. 22, 1957